United States Patent Office 3,245,799
Patented Apr. 12, 1966

3,245,799
METHOD OF PREVENTING BLACK SPOTTING OF AN UNLEAVENED DOUGH FOR REFRIGERATED STORAGE
Samuel A. Matz, Liverpool, N.Y., assignor to The Borden Company, New York, N.Y., a corporation of New Jersey
No Drawing. Filed May 23, 1963, Ser. No. 282,584
3 Claims. (Cl. 99—90)

This invention relates to a cereal dough for refrigerated storage and subsequent baking in making biscuits, puff pastry, pie crusts or the like. The invention has particular reference to the method of preventing discoloration and darkening in refrigerated pastry doughs stored in an oxygen-containing environment and will be illustrated by description in connection with such use.

In making pastry doughs for refrigerated storage it has been noted that upon storage at or about 40° F. (typical refrigeration conditions) for a period of two weeks or more there develop on the dough black spots and/or greyish areas and discolorations. This storage phenomena is first evidenced by the appearance of tiny gray specks scattered irregularly throughout the dough. The spots slowly enlarge and become darker. Also there is a tendency for the background to become greyer with time. At the end of about three to four weeks the doughs are quite unattractive and are unacceptable to the consumer. Attempts have been made to overcome this black spot development or discoloration by storage of the pastry dough in an atmosphere very low in, or containing no, oxygen. Although this is somewhat useful it is still found that after a short storage period under refrigeration, e.g., about three weeks, the black spotting and greying and other discoloration of the pastry dough does occur.

It has now been found that the doughs can be made which will not exhibit this spotty discoloration or greying of the dough for periods of up to 8 weeks or longer at storage under refrigeration conditions.

Briefly stated, the present invention comprises the process of acidifying the dough to a pH of about 4.5 and below with an edible food grade acid which will not interfere with the physical properties of the dough nor with the appearance, texture or with the flavor of the baked products, and the resultant product.

All components of the dough must be food grade materials and, with the exception of the acid, are used in proportions conventionally used to prepare doughs for refrigerated storage.

The acid used may be any edible food grade acid which will not interfere with the physical properties of the dough, nor with the appearance, texture or flavor of the resultant baked product. Examples are adipic, fumaric, gluconic, and citric acids and glucono delta lactone. The citric acid is preferred and it may be any natural or fermentation-derived citric acid which is of a type and grade suitable for use in food and contains not less than 95% citric acid as determined by total titratable acidity.

The flour used is a standard flour for pastry dough, as for instance soft red or white wheat flour containing not more than about 10.5% protein. For pie crusts the weakest flour available is most suitable, one containing about 7.0% to about 8.5% protein.

Any shortening conventionally used in pastry can be used. Examples are lard, edible beef fats combined with vegetable oils or cotton seed oil, and butter. In making puff-pastry special shortenings are used which are generally compounds of meat fats, vegetable oils, water, and salt. Butter and puff-paste margarine can also be used.

Other ingredients used to prepare the pastry dough are seasoning agents such as salt, sugar, corn syrup, dextrose, whey, non-fat milk solids and the like, and preservatives such as sodium benzoate and sodium or calcium propionates.

Water is used in an amount to make the dough handleable and to give the desired "flakiness" to the pastry. Suitable amounts of water are 20 to 50 parts for 100 parts of flour, the exact proportion varying with the grade of flour used and flakiness desired.

As noted previously, the ingredients of the pastry dough are used in the customary proportions. The amount of acid used is such as to adjust the pH of the dough to about 4.5 or below. The practical lower limit of pH is about 3.5 In the case of citric acid this is accomplished by adding about 0.2 part by weight of citric acid for each 100 parts by weight of flour used. Equivalent amounts of other food grade acids are used which will lower the pH of the dough to about 4.5 or lower.

The present invention will be illustrated by the following examples wherein all parts are by weight unless otherwise indicated.

Example 1

A pie dough was prepared from the followin ingredients:

| | Parts by weight |
|---|---|
| Pastry flour | 600 |
| Salt | 7.2 |
| Sodium benzoate | 1.1 |
| Citric acid | 1.2 |
| Water | 246 |
| Puff paste margarine | 300 |

The flour, salt, sodium benzoate and citric acid were admixed in a commercial mixer for approximately one minute at slow speed. The margarine was then added and mixing continued until the fat had been broken up and uniformly distributed through the mass. The water was then added and mixing continued until a homogeneous dough was formed. The dough had a pH of 4.35.

The dough was then cut into convenient size pieces and shaped into pie dough circles for tops and also as bottoms of pies.

The dough circles were prepared for packaging by thoroughly dusting them on both sides with flour and then placing them on discs of stiff parchment paper having a diameter slightly larger than the dough. Stacks consisting of two dough circles and two parts of parchment circles were rolled into a cylinder 4½ inches in diameter, the cylinders were then inserted into a tube or an envelope of plastic and sealed.

The packaged doughs were then refrigerated at temperatures of about 40° F. and samples were removed at intervals for observation of black spotting and other discoloration. At the end of 8 weeks no black spotting or discoloration was observed.

Example 2

The procedure and composition of Example 1 was used in making two batches of dough except that no citric acid was used in one batch (the dough had a pH of 5.2) and in the other 0.6 part (the dough had a pH of 4.7). At the end of three weeks both pie doughs exhibited black spots and overall dough discoloration with the worst samples being the pie doughs containing no citric acid.

Example 3

The procedure and composition of Example 1 is used except that equivalent amounts of fumaric acid, gluconic acid, and glucono delta lactone are substituted for the citric acid. In each case comparable results are obtained.

Example 4

A puff pastry dough was prepared by mixing the following ingredients:

| | Parts by weight |
|---|---|
| Cake flour | 170 |
| Bread flour | 830 |
| Salt | 15 |
| Margarine | 250 |
| Sodium benzoate | 2 |
| Glucono-delta-lactone | 8 |
| Water | 475 |

After the dough had become homogeneous, it was removed from the mixer and sheeted out to a thickness of about one-fourth inch. The dough pH was 4.5. On two-thirds of the surface of the approximately rectangular dough sheet were spread 500 parts of puff-pastry margarine. The sheet was then folded so that an assemblage of two layers of fat and three layers of dough resulted. This assemblage was sheeted out to a thickness of about one-half inch and was then sheeted out again. The folding and sheeting operation was reported two more times and then the sheet was reduced to about one-eighth inch in thickness. From the thin dough were cut parallelograms approximately five inches along each side with 75° and 105° angles at the corners. These pieces could have been used to prepare puff pastry turnovers by placing 25 to 50 grams of a fruit filling in the center, folding over one of the pointed ends of this dough to form a triangle enclosing the filling and sealing the dough edges together. However, in the present case the dough pieces were prepared as for retail distribution by sealing a stack of four of the flat sheets interleaved with parchment in an envelope of plastic film. A control batch was prepared in exactly the same manner except that no glucono-delta-lactone was included in the dough. The envelopes of dough were stored at 40° F. for five weeks. When examined at the end of that time, the control doughs were copiously sprinkled with black spots and the area between the spots had started to turn grey. The doughs containing glucono-delta-lactone were still white and free of spots.

It will be understood that it is intended to cover all changes and modifications of the examples of the invention herein chosen for the purpose of illustration which do not constitute departures from the spirit and scope of the invention.

I claim:

1. The method of preventing black spotting and discoloration of an unleavened dough for refrigerated storage and subsequent baking comprising adding to the dough an edible food grade acid in an amount sufficient to adjust the pH of the dough to about 4.5 and below.

2. The method of preventing black spotting and discoloration of an unleavened pastry dough for refrigerated storage and subsequent baking comprising adding to the dough an edible food grade acid in an amount sufficient to adjust the pH of the dough to about 4.5 and below.

3. The method of preventing black spotting and discoloration of an unleavened pie crust dough for refrigerated storage and subsequent baking comprising adding to the dough an edible food grade acid in an amount sufficient to adjust the pH of the dough to about 4.5 and below.

References Cited by the Examiner

UNITED STATES PATENTS

| 2,731,350 | 1/1956 | Busch | 99—92 |
| 2,942,988 | 6/1960 | Erekson et al. | 99—192 |
| 2,982,662 | 5/1961 | Cochran | 99—92 |

A. LOUIS MONACELL, *Primary Examiner.*

RAYMOND N. JONES, *Examiner.*